Dec. 8, 1964   E. W. NEUMEISTER   3,160,083
ADAPTER KIT FOR CAMERAS
Filed Sept. 12, 1962   3 Sheets-Sheet 1

INVENTOR.
EWALD W. NEUMEISTER
BY
Morgan, Finnegan, Durham & Pine
ATTORNEYS

Dec. 8, 1964  E. W. NEUMEISTER  3,160,083
ADAPTER KIT FOR CAMERAS
Filed Sept. 12, 1962  3 Sheets-Sheet 2
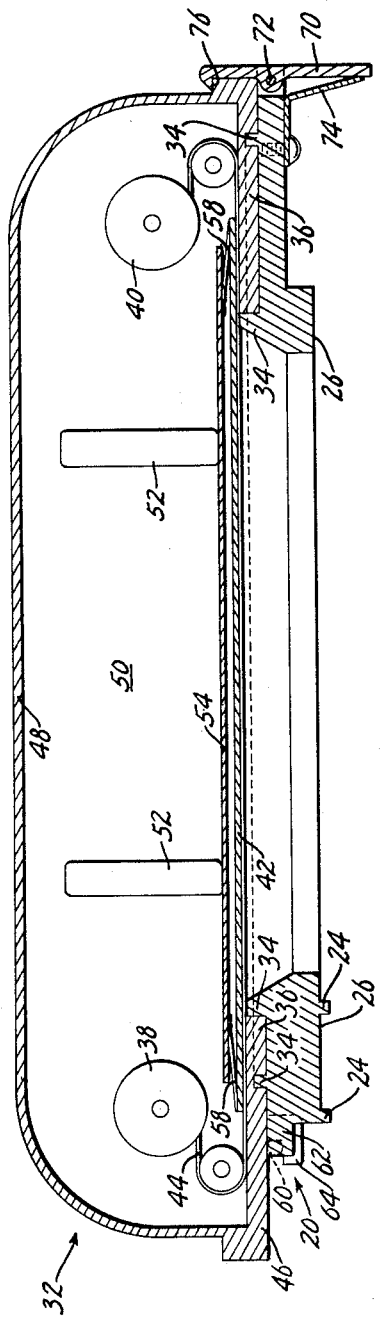
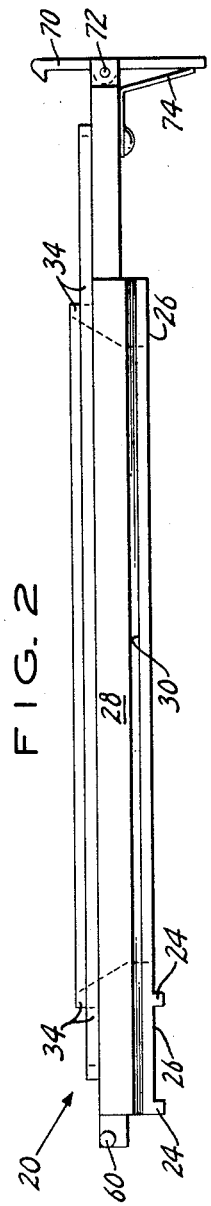
INVENTOR.
EWALD W. NEUMEISTER
BY
Morgan, Finnegan, Durham & Pine
ATTORNEYS Dec. 8, 1964   E. W. NEUMEISTER   3,160,083
ADAPTER KIT FOR CAMERAS
Filed Sept. 12, 1962   3 Sheets-Sheet 3

INVENTOR.
EWALD W. NEUMEISTER
BY
Morgan, Finnegan, Durham & Pine
ATTORNEYS

United States Patent Office 3,160,083
Patented Dec. 8, 1964

3,160,083
ADAPTER KIT FOR CAMERAS
Ewald W. Neumeister, 206 Foxhurst Road,
Oceanside, Long Island, N.Y.
Filed Sept. 12, 1962, Ser. No. 223,158
2 Claims. (Cl. 95—34)

The present invention relates to a novel and improved image-area expander kit for use with photographic cameras which provides a larger image area than the area for which the camera was designed and manufactured.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Most of the larger cameras which are normally used for taking pictures in color provide for an image which has its longer dimension about one-third greater than its smaller dimension, and are adapted to be used with sheet film. Thus, a common size of camera is one which takes an image on a sheet of film which has nominal dimensions of 4 by 5 inches, the actual image area being considerably less due to the necessity for holding the film in the focal plane by its edges. Where it is desired to take scenes which are to be used for reproduction as postcards, which have a standard dimension of 3¼ by 5½ inches, and more especially where it is desired to take pictures which may be used with the more recent panoramic postcards which are about 3½ by about 9 inches, the camera user is confronted with the choice of using a much larger camera than is now normally used, and with using a much larger sheet of film most of which is wasted, or taking the scene on a smaller area of film, wasting much of the area and enlarging the image to a considerable extent with the resultant loss in detail.

It is an object of the present invention to provide an adapter kit which is especially intended and designed to convert a standard modern type of view camera to operate with roll film, and to provide photographic images which are considerably wider than those which are normally possible with the camera. Thus, using a camera which normally takes an image on film having the dimensions of 4 by 5 inches (actually about 3¾ by 4¾ inches) it becomes possible to take an image which is about 2⅛ by about 5⁷⁄₁₆ inches, and to take such images on standard roll film. A standard eight exposure roll of film which is intended to take eight exposures of 2¼ by 3¼ dimensions can thus be made to serve for five exposures which will be about 5¼ inches each in width.

The present invention provides an adapter kit which may be fitted to the back of a normal view camera and which is rearwardly enlarged in its exposure area with respect to its lateral dimension, and in turn is adapted to receive a film holder, such as a roll-film magazine, whereby the focal plane of the camera is rearwardly displaced with respect to its normal position and provision is made for a wider image than would normally be possible with the view camera.

It will be understood that the foregoing general descripton and the following detailed description as well are exemplary and explanatory of the invention but are not restrictive thereof.

Of the drawings:

FIGURE 2 is a top plan view of an image expander kit in accordance with the present invention;

FIGURE 5 is a cross sectional view of the expander kit and roll film magazine ready to be mounted on and locked to the back of a standard view camera.

Figure 1:
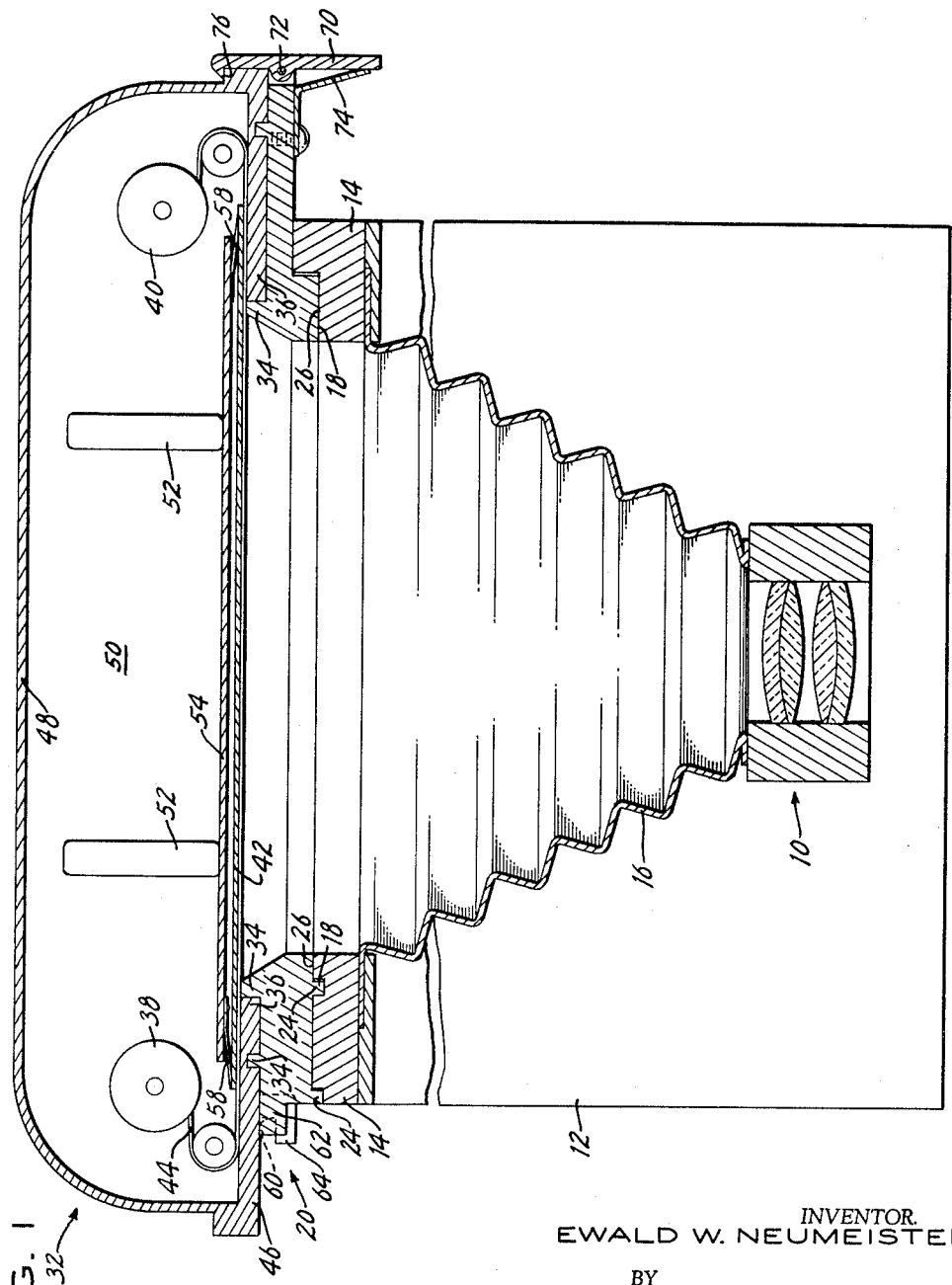
FIGURE 1 is a cross section, somewhat schematic, of a view camera assembly to which the image expander kit of the present invention has been applied and which is provided with a roll film magazine of conventional constriction.
Figure 3:
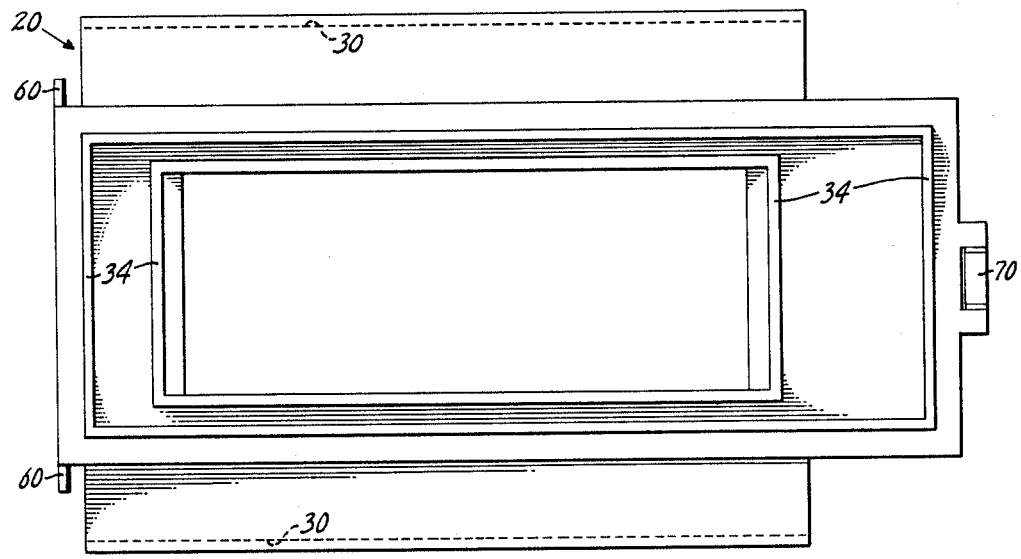
FIGURE 3 is a rear elevation of the expander kit of FIGURE 2.
Figure 4:
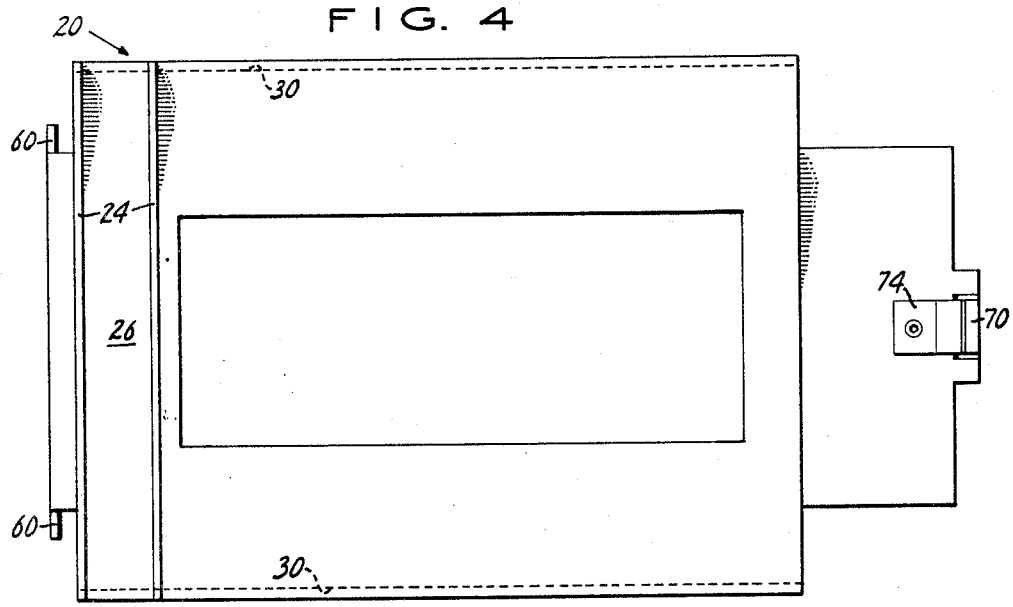
FIGURE 4 is a front elevation of the expander kit of FIGURES 2 and 3.

Referring now in detail to the present preferred and illustrative embodiment of the invention as disclosed in the accompanying drawings:

FIGURE 1 shows a schematic sectional view of a conventional form of modern view camera of a type normally intended to produce a photographic image having nominal dimensions of 4 by 5 inches. In such a camera there is provided a shutter-lens mechanism 10 which is securely mounted on a base member 12 but is relatively movable with respect to the base member, and is usually provided with suitable adjustments to allow the lens to be moved vertically, laterally and angularly with respect to the lens axis. The mounting and adjusting mechanisms for the shutter-lens mechanism are not shown as such means are conventional and well known in the art. The lens may be moved forward and rearwardly to focus the image formed by the lens on the focal plane where the sensitive surface of the film is located, and the movement of the lens usually is finely regulated by adjusting means on the base member of the camera. However, the details of the lens moving and adjusting mechanism vary from one make of camera to another and in no way affect the present invention.

At the rear of the conventional camera schematically disclosed in FIGURE 1, there is provided the camera back which comprises a rectangular frame 14 adapted to receive a sheet film holder at right angles to the normal axis of the camera lens 10.

Between the camera back and the rectangular frame 14 and the lens 10 are provided light-excluding bellows 16 or other extensible means whereby the lens may be variably spaced from the frame 14 while the interior of the structure is secluded from any light except the light passing through the lens 10.

On the rear face of the frame structure 14, the frame is provided with the usual grooves 18 which allow it to form light-tight seals with the sheet film holder, and also with locking slides, not shown, by which the back frame receives and securely holds the sheet film holders.

The adapter kit of the present invention comprises a generally rectangular frame member 20, the forward surface of which provides an opening at least as wide as the image area opening of the camera with which it is to be used, and on its rearward surface is provided with a wider opening, the front and rear openings being connected by parts of the frame which do not intrude into the rearwardly enlarging space between the forward and rearward open areas of the frame. Thus, preferably the kit provides lateral walls which are bevelled to provide expanding surfaces from front to back.

The forward or front surface of the kit is provided with ribs 24 and surfaces 26 which not only serve to locate the kit accurately with respect to the rear camera frame 14, but also serve to provide light seals preventing extraneous light from entering the camera chamber and fogging the film. The precise location of these ribs will be determined by the camera with which the kit is to be used, although as shown in the drawing, they are adapted for use with a conventional type of view camera.

The upper and lower faces 28 of the adapter kit 20 are provided with channels or grooves 30 similar to those normally provided on a sheet film holder and are thus adapted to be engaged by the normal locking slide members with which the conventional camera back is provided.

On its rear face, the adapter kit 20 of the present invention is provided with means to interengage the roll film magazine 32 with which the adapter kit is preferably used. It is also preferably provided with projecting ribs 34 which are adapted to form light seals with complementary members 36 on the roll film magazine.

The roll film magazine 32 shown in FIGURES 1 and 5 is a conventional type of roll-film magazine, and comprises an elongated light tight box having a removable cover (not shown) to allow it to be loaded with a suitable roll of film. It also includes means for advancing the film from the supply roll 38 to the take-up roll 40, and a pressure plate 42 to hold the film 44 in the focal plane of the camera. For this purpose, there is provided a front plate 46 connected to the rear housing enclosing wall 48 and a bottom wall 50 and a top wall (not shown). Connected to the bottom wall are support members 52 which provide mountings for the pressure plate 54 mounting member to which the pressure plate 42 is connected and resiliently urged forward by means of sensitive leaf springs 58. Thereby, the pressure plate 42 is urged against the rear face of the forward wall 46 of the film magazine, its top and bottom edges being held behind the margins of the opening in the adapter kit 20.

The roll film magazine may also be provided with a conventional dark slide so as to permit it to be removed and repositioned on the adapter kit without exposing film.

For focusing, a ground glass frame may be provided to be located in place of the roll film magazine when the roll film magazine is not in place and with the ground glass surface accurately located in the same plane as the front surface of the film in the roll film magazine when in position.

The roll film magazine is detachably connected to the adapter kit at its two lateral ends. At one end, the adapter kit is provided with upwardly and downwardly projecting pins 60 which are fast to the one end 62 of the adapter kit body and are adapted to engage in slotted brackets 64 which are carried in appropriate locations and are fast to the forward face 46 of the roll film magazine 32. At its other end, the roll film magazine is detachably secured to the adapter kit by means of a pivoted latch member, pivotally mounted on the end of the adapter kit by means of pivot pin 72, and urged to latching position by means of a leaf spring 74 which is riveted to the end member of the adapter kit and has its free end bearing against the latch member 70. The latch end of the latch member 70 is adapted to engage with a shoulder 76 formed on the end of the roll film magazine, thereby securely holding the roll film magazine to the adapter kit with the roll film surface in a position where it may be in the focal plane of the camera lens by proper adjustment of the camera lens.

In use, the camera, adapter kit and roll film magazine are used with a camera lens which is generally of a somewhat shorter focal length than would normally be used with the camera. Thus, for a camera normally taking a picture 4 x 5 inches, the user would employ a lens with a focal length of about 6½ or 7 inches, while when using the adapter kit to give a wider image, it will be advantageous to employ a lens having a focal length of about 5½ inches or even 5 inches.

The negatives produced by the adapter kit of the present invention are narrower and wider than those produced by the camera without the adapter kit, and thus lend themselves to the production of pictures resembling panoramic views, but without the wastage of film which would be required by merely using a shorter focal length lens, and without the necessity of using a special camera such as a panoramic view camera. Thus, the adapter kit of the present invention provides a simple, inexpensive means for adapting a precision form of view camera to the production of narrower and wider negatives than would normally be possible.

The invention in its broader aspects is not limited to the specific mechanisms shown and described but departures may be made therefrom within the scope of the accompanying claims without departing from the principles of the invention and without sacrificing its chief advantages.

What is claimed is:

1. An adapter kit to be fitted between the back of a camera and a roll film magazine, comprising a member having an image area which is narrower than the image area of the camera, the image area of said member being laterally enlarged rearwardly of the member whereby it is wider than the image area of the camera, and means for detachably connecting said kit to the rear of the camera and to the front of a roll film magazine.

2. An adapter kit according to claim 1 in which the front and back faces of the kit are provided with locating and light sealing means to cooperate with locating and light sealing means on the camera back and on the front of the magazine.

References Cited by the Examiner
UNITED STATES PATENTS

| | | | |
|---|---|---|---|
| 1,509,399 | 9/24 | Feltenstein | 95—34 X |
| 2,210,988 | 8/40 | Shelton | 95—31 |
| 3,089,398 | 5/63 | Wilms | 95—11 |

EVON C. BLUNK, *Primary Examiner.*